(No Model.)
W. A. KELLY.
FAUCET FOR WASHSTANDS.
No. 556,755. Patented Mar. 24, 1896.
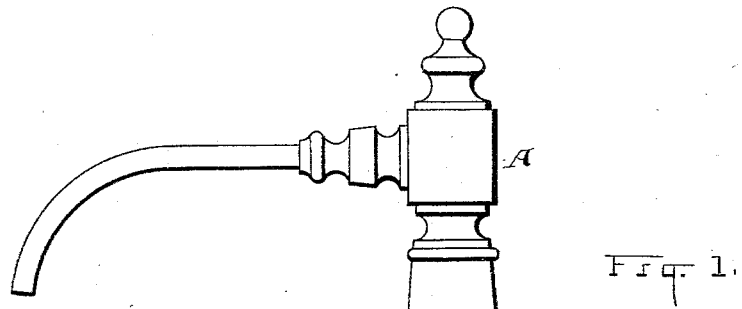
Fig. 1.
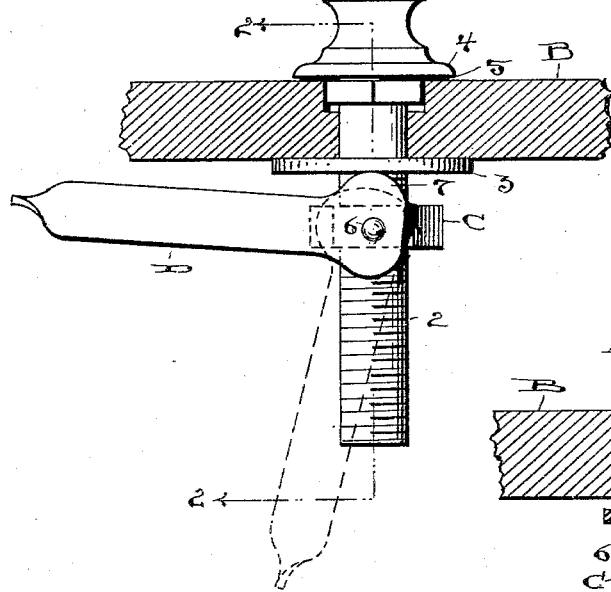
Fig. 2.
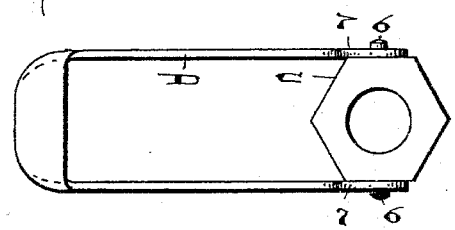
Fig. 3.
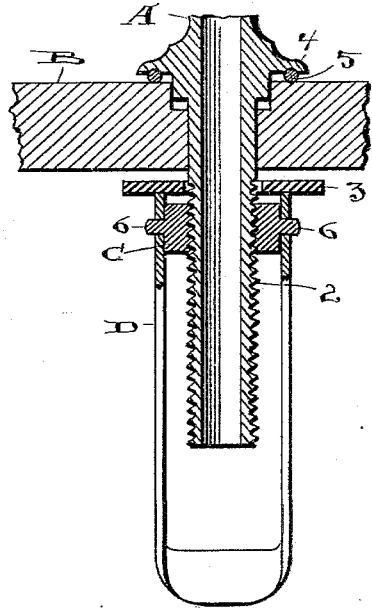
ATTEST
B. B. Moser
M. T. Harrington
INVENTOR.
William A. Kelly
BY H. T. Fisher
ATTY

UNITED STATES PATENT OFFICE.

WILLIAM A. KELLY, OF CLEVELAND, OHIO.

FAUCET FOR WASHSTANDS.

SPECIFICATION forming part of Letters Patent No. 556,755, dated March 24, 1896.

Application filed June 6, 1895. Serial No. 551,930. (No model.)

*To all whom it may concern:*

Be it known that I, WILLIAM A. KELLY, a citizen of the United States, residing in Cleveland, in the county of Cuyahoga and State of Ohio, have invented certain new and useful Improvements in Faucets for Washstands; and I do hereby declare that the following is a full, clear, and exact description of the invention, which will enable others skilled in the art to which it appertains to make and use the same.

My invention relates to faucets for washstands; and the invention consists in a faucet and mechanism for firmly securing the faucet to the basin or marble slab and for easily releasing the same when required.

It is well known to those experienced in this art that the usual basin cock or faucet is set either near the wall or in a corner, with the wall at two sides very close thereto, and that the basin comes down in front thereof and close thereto, so that it is difficult to approach the securing-nut of the faucet from any possible position to either tighten or release the nut, especially after the basin has been placed in position. To these are the added difficulties of approach when the usual casing and doors beneath the basin-slab have been put into place.

My invention has for its object to relieve the situation of these objections and difficulties and to provide mechanism connected with the nut which in itself will serve to turn the nut and lock the parts firmly together, and which is fixed and accessible, all substantially as shown and described and particularly pointed out in the claims.

In the accompanying drawings, Figure 1 is a plain elevation of a well-known form of basin cock or faucet and a cross-section of a basin-slab and showing my improved attachment in fastened position. Fig. 2 is a vertical central section elevation of the mechanism shown in Fig. 1 and taken on line 2 2 of said figure, but with the fastening mechanism released. Fig. 3 is a plan view of the securing-nut and its controlling and fastening yoke, as shown in Fig. 1, and as hereinafter more fully described.

A represents what may be any well-known form or style of basin cock or faucet, and B a marble or other suitable slab in which said faucet is seated and secured. The threaded stem 2 for pipe connections projects below the slab B, and a common form of disk or washer 3 is shown about the neck of this threaded extension at the slab B. An ornamental flange 4 at the base of the upper portion of the faucet rests upon the slab, and for better operation I have here shown a rubber gasket or ring 5 placed between this flange and the slab B. This gasket or its equivalent may be used, and whatever space may remain open between the flange and the slab can easily be filled with plaster-of-paris, so as to be perfectly closed.

Now, in order that the usual wrench for turning the fastening-nut C may be dispensed with and the said nut be always under certain and easy control, whatever the location of the faucet and the usual difficulties in applying the wrench to said nut may be, I have secured a yoke D to the nut by pivoting the same on the lateral trunnions 6 on opposite sides of the nut and have provided said yoke on both sides its pivot with an enlargement or cam 7 adapted to bear against the bottom of the washer-plate 3.

In practice, therefore, it is only necessary to turn the nut by means of its attached yoke D hanging in a suspended position, as in Fig. 2, up into about the position as shown in Fig. 2. This can easily be done by hand. Then in order to secure the faucet firmly in place it is only necessary to turn the yoke D on its pivot up into a substantially horizontal position, as seen in Fig. 1, when all the parts will be as firmly held together as they would be if the nut C were itself turned hard against the part 3. This done, all the parts may rest in this position for an indefinite period and remain so without danger of becoming displaced. However, when it becomes necessary for any reason, and as frequently occurs, to remove the faucet A, I need only to draw the free end of the yoke D down and this will liberate all the parts and the nut can be turned off if desired, the said yoke in such case serving as a lever or wrench to turn the nut. I have obtained very satisfactory results by simply turning the nut and the yoke together up and fastening the faucet in this way without much, if any, lateral movement of the yoke alone.

In Fig. 1 it will be seen that the lower camsurface is of slightly less depth than the upper, so that if it will not lock well one way the cam can be turned the other way.

What I claim is—

1. The faucet described having a threaded shank, in combination with the securing-nut on said shank and a yoke pivoted on said nut and constructed with a cam portion to lock the nut, substantially as set forth.

2. The faucet provided with a threaded shank and the slab on which it rests in combination with the securing-nut on the said shank below the slab, said nut having trunnions at its sides, and a yoke pivoted on said trunnions and having a cam portion to bear against the said slab, substantially as set forth.

3. The slab or plate described, in combination with a faucet having a threaded shank projecting through the same, a securing-nut on said shank and a swinging yoke pivoted on said nut to turn the same, and having cams 7 on its edge near its pivot-point, whereby when said yoke is turned up the parts are locked together, substantially as set forth.

4. The slab described and the faucet having a flange to rest on said slab and a shank extending through the same, in combination with a piece of yielding material inserted between the slab and said flange, a vertically-adjustable part on said shank and a cam-headed yoke pivoted on said adjustable part to bear against the bottom of the slab, substantially as set forth.

5. The faucet described having a shank constructed to extend below the supporting-slab, and provided with a series of horizontal projections one above the other, in combination with the part C constructed to engage said projections and to be raised or lowered thereon, and the yoke D pivoted on said part C and provided with a cam 7, substantially as set forth.

Witness my hand to the foregoing specification this 20th day of May, 1895.

WILLIAM A. KELLY.

Witnesses:
H. T. FISHER,
R. B. MOSER.